(12) United States Patent
Powell

(10) Patent No.: US 6,308,454 B1
(45) Date of Patent: Oct. 30, 2001

(54) PESTICIDE DISPENSING DEVICE

(76) Inventor: Ronnie F. Powell, Rte. 3 Box 250, Elba, AL (US) 36323

( * ) Notice: Subject to any disclaimer, the term of this patent is extended or adjusted under 35 U.S.C. 154(b) by 0 days.

(21) Appl. No.: 09/612,089

(22) Filed: Jul. 7, 2000

(51) Int. Cl.[7] ................................................... A01M 7/00
(52) U.S. Cl. ............................................. 43/124; 43/132.1
(58) Field of Search ................................. 483/124, 121, 483/132.1, 131; 239/8, 10, 373, 310, 532, 318; 111/7.1, 7.2, 7.3, 7.4; 141/383; 222/81–89

(56) References Cited

U.S. PATENT DOCUMENTS

| D. 359,570 | 6/1995 | Garber . |
| 1,646,767 | 10/1927 | Schille . |
| 2,083,153 | 6/1937 | Irish . |
| 3,774,556 | * 11/1973 | Poll ........................................ 111/7.2 |
| 4,297,055 | * 10/1981 | Peacock ............................... 405/184 |
| 5,193,721 | 3/1993 | Gryder . |
| 5,325,626 | 7/1994 | Jackson . |
| 5,671,887 | * 9/1997 | Iavarone ............................... 239/310 |
| 5,746,021 | 5/1998 | Green . |
| 5,881,493 | * 3/1999 | Restive ................................... 43/124 |
| 5,947,172 | * 9/1999 | Glotin .................................. 141/383 |

FOREIGN PATENT DOCUMENTS

4120188-C * 9/1992 (DE) .

\* cited by examiner

*Primary Examiner*—Peter M. Poon
*Assistant Examiner*—Floris C Copier

(57) ABSTRACT

A pesticide dispensing device for dispensing insecticide in a localized area. The pesticide dispensing device includes a tubular member. The tubular member is elongate and has a first end and a second end. The tubular member is generally hollow. A bore is in the tubular member. The bore is generally adjacent to the second end. A handle member for holding the tubular member is integrally coupled to the first end of the tubular member. A device for dispensing liquid dispenses liquid from the tubular member through the bore.

11 Claims, 4 Drawing Sheets

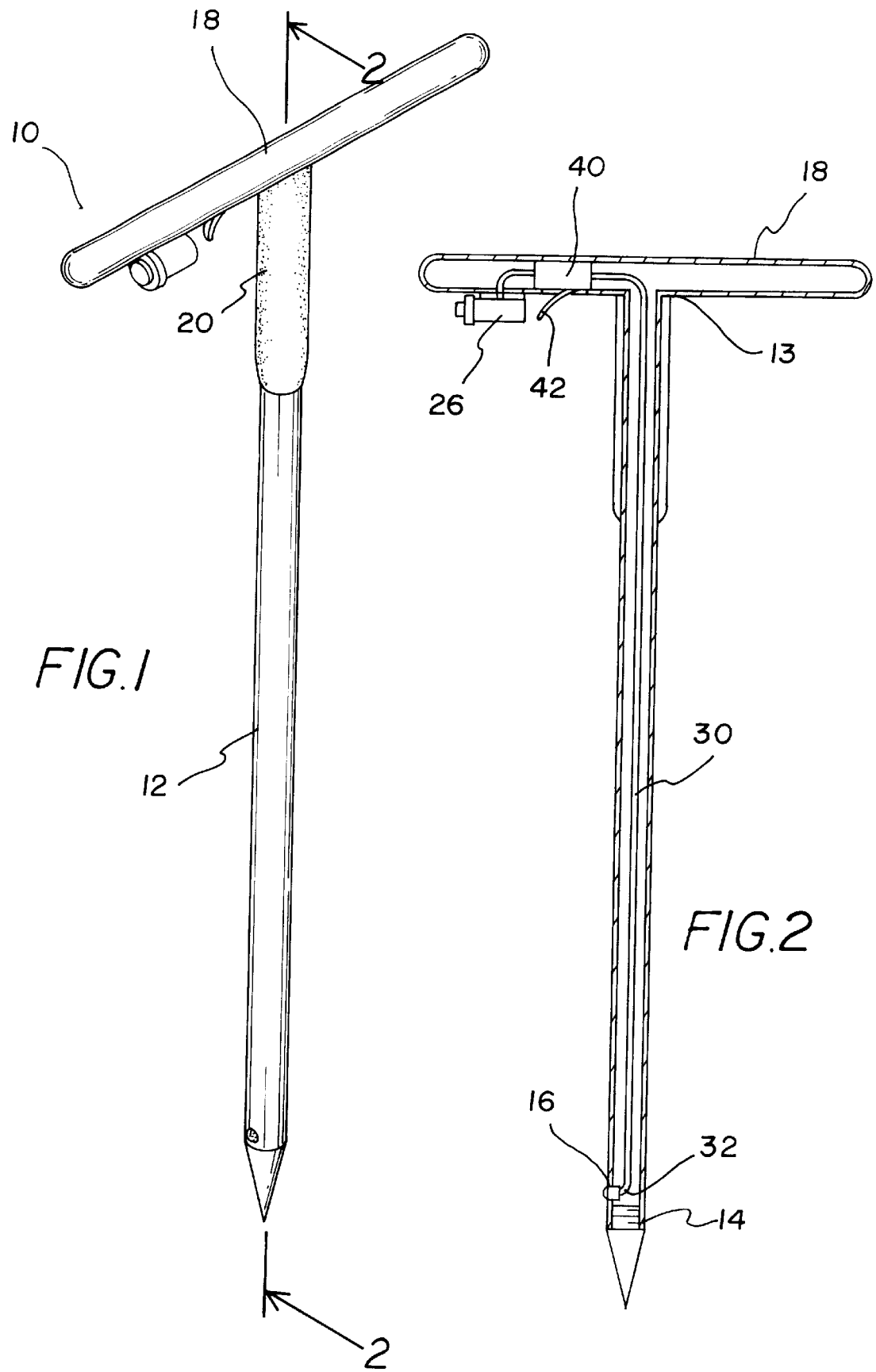

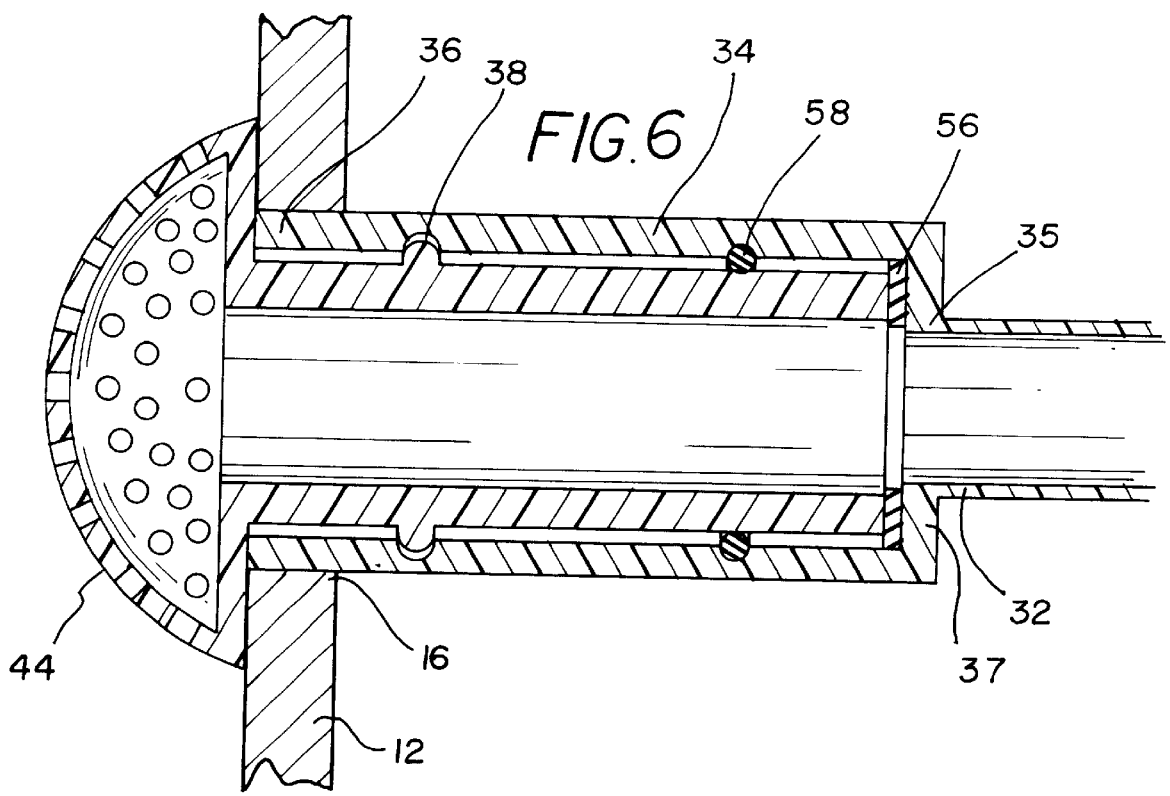
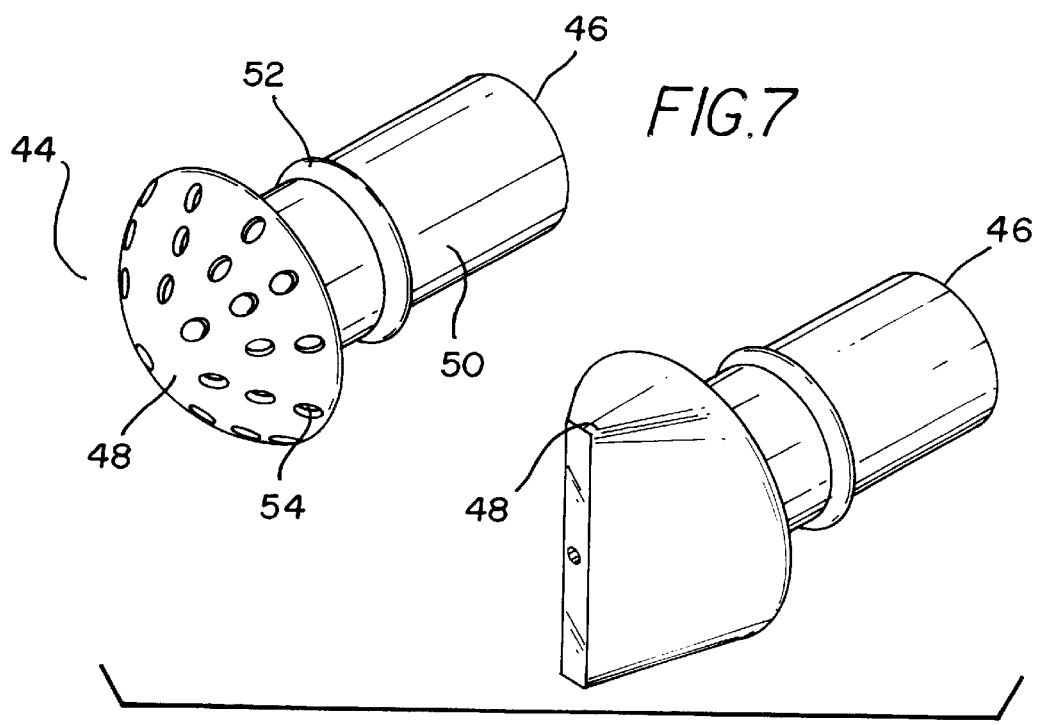

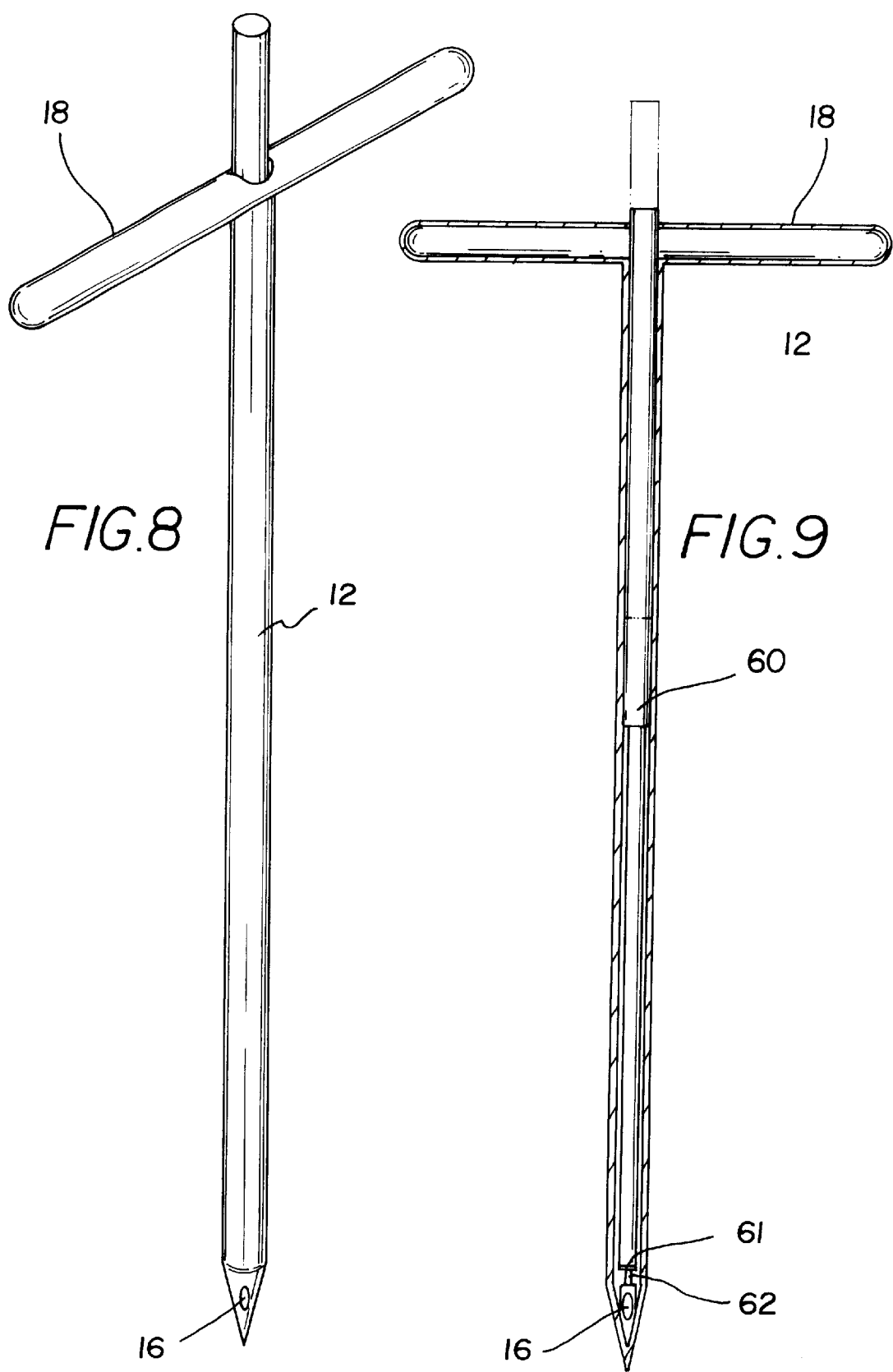

PESTICIDE DISPENSING DEVICE

BACKGROUND OF THE INVENTION

1. Field of the Invention

The present invention relates to pesticide dispensers and more particularly pertains to a new pesticide dispensing device for dispensing insecticide in a localized area.

2. Description of the Prior Art

The use of pesticide dispensers is known in the prior art. More specifically, pesticide dispensers hereto fore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,325,626; 5,746,021; 2,083,153; 5,193,721; 1,646,767; and 359,570.

While these devices fulfill their respective, particular objectives and requirements, the aforementioned patents do not disclose a new pesticide dispensing device. The inventive device includes a tubular member. The tubular member is elongate and has a first end and a second end. The tubular member is generally hollow. A bore is in the tubular member. The bore is generally adjacent to the second end. A handle member for holding the tubular member is integrally coupled to the first end of the tubular member. A means for dispensing liquid dispenses liquid from the tubular member through the bore.

In these respects, the pesticide dispensing device according to the present invention substantially departs from the conventional concepts and designs of the prior art, and in so doing provides an apparatus primarily developed for the purpose of dispensing insecticide in a localized area.

SUMMARY OF THE INVENTION

In view of the foregoing disadvantages inherent in the known types of pesticide dispensers now present in the prior art, the present invention provides a new pesticide dispensing device construction wherein the same can be utilized for dispensing insecticide in a localized area.

The general purpose of the present invention, which will be described subsequently in greater detail, is to provide a new pesticide dispensing device apparatus and method which has many of the advantages of the pesticide dispensers mentioned heretofore and many novel features that result in a new pesticide dispensing device which is not anticipated, rendered obvious, suggested, or even implied by any of the prior art pesticide dispensers, either alone or in any combination thereof.

To attain this, the present invention generally comprises a tubular member. The tubular member is elongate and has a first end and a second end. The tubular member is generally hollow. A bore is in the tubular member. The bore is generally adjacent to the second end. A handle member for holding the tubular member is integrally coupled to the first end of the tubular member. A means for dispensing liquid dispenses liquid from the tubular member through the bore.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pesticide dispensing device apparatus and method which has many of the advantages of the pesticide dispensers mentioned heretofore and many novel features that result in a new pesticide dispensing device which is not anticipated, rendered obvious, suggested, or even implied by any of the prior art pesticide dispensers, either alone or in any combination thereof.

It is another object of the present invention to provide a new pesticide dispensing device which may be easily and efficiently manufactured and marketed.

It is a further object of the present invention to provide a new pesticide dispensing device which is of a durable and reliable construction.

An even further object of the present invention is to provide a new pesticide dispensing device which is susceptible of a low cost of manufacture with regard to both materials and labor, and which accordingly is then susceptible of low prices of sale to the consuming public, thereby making such pesticide dispensing device economically available to the buying public.

Still yet another object of the present invention is to provide a new pesticide dispensing device which provides in the apparatuses and methods of the prior art some of the advantages thereof, while simultaneously overcoming some of the disadvantages normally associated therewith.

Still another object of the present invention is to provide a new pesticide dispensing device for dispensing insecticide in a localized area.

Yet another object of the present invention is to provide a new pesticide dispensing device which includes a tubular member. The tubular member is elongate and has a first end and a second end. The tubular member is generally hollow. A bore is in the tubular member. The bore is generally adjacent to the second end. A handle member for holding the tubular member is integrally coupled to the first end of the tubular member. A means for dispensing liquid dispenses liquid from the tubular member through the bore.

Still yet another object of the present invention is to provide a new pesticide dispensing device that particularly well suited for killing fire ants as the insecticide may be injected into the colony of the ants.

Even still another object of the present invention is to provide a new pesticide dispensing device that has multiple drilling attachments for drilling into various forms of soil.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of the first embodiment of a new pesticide dispensing device according to the present invention.

FIG. 2 is a schematic cross-sectional view taken along line 2—2 of the first embodiment the present invention.

FIG. 6 is a schematic cross-sectional view of a diffuser of the present invention.

FIG. 7 is a schematic perspective view of diffusers the present invention.

FIG. 8 is a schematic perspective view of the second embodiment of the present invention.

FIG. 9 is a schematic cross-sectional view of the second embodiment of the present invention.

DESCRIPTION OF THE PREFERRED EMBODIMENT

Figure 3:
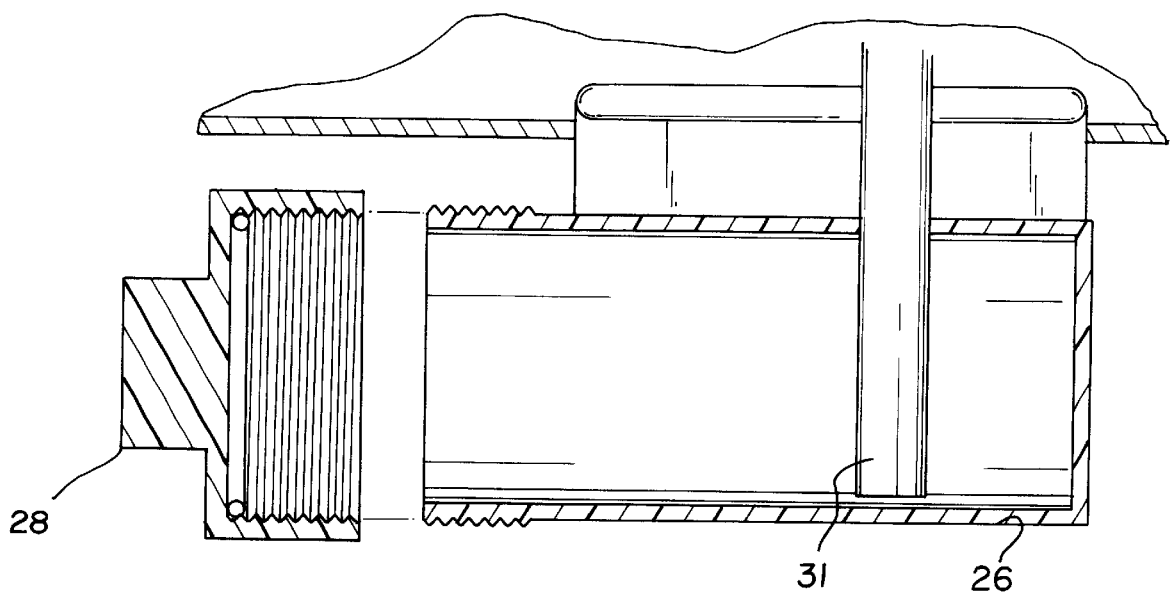
FIG. 3 is a schematic cross-sectional view of the storage container of the first embodiment the present invention.
Figure 4:
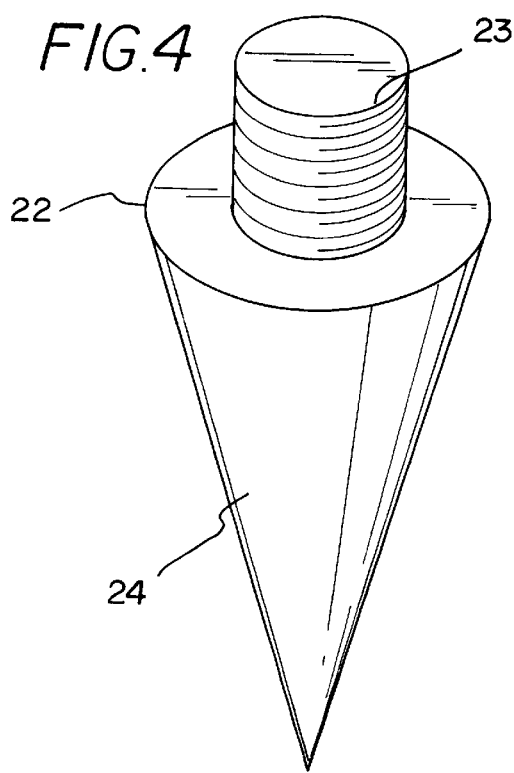
FIG. 4 is a schematic perspective view of a drilling member of the present invention.

With reference now to the drawings, and in particular to FIGS. 1 through 9 thereof, a new pesticide dispensing device embodying the principles and concepts of the present invention and generally designated by the reference numeral 10 will be described.

As best illustrated in FIGS. 1 through 9, the pesticide dispensing device 10 generally comprises a tubular member. The tubular member 12 is elongate and has a first end 13 and a second end 14. The tubular member 12 is generally hollow. Each of the first 13 and second 14 ends of the tubular member 12 has openings therein. The second end 14 has an internal surface which is threaded for reasons which will become readily apparent. A bore 16 is in the tubular member 12. The bore 16 is generally adjacent to the second end.

A handle member for holding the tubular member 12 comprises a rod 18. The rod 18 is generally hollow and has a middle portion which is fluidly connected to the first end 13 of the tubular member 12. The rod 18 is preferably orientated generally perpendicular to the tubular member 12.

A gripping means 20 for gripping the tubular member 12 extends around a portion of the tubular member 12 generally adjacent to the handle member 18. Ideally, the gripping means 18 is an elastomeric coating but can be any conventional coating used for gripping.

Figure 5:
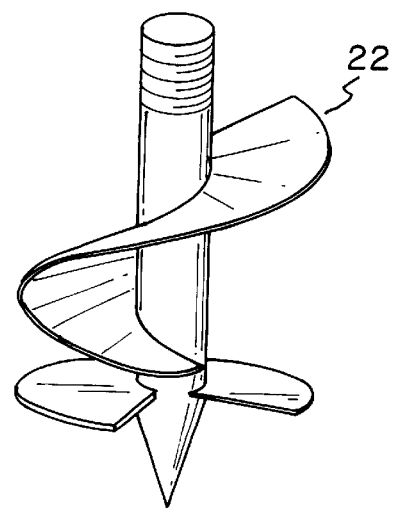
FIG. 5 is a schematic perspective view of a drilling member the present invention.

A drilling member 22 assists the user when drilling into the soil. The drilling member 22 has a distal portion 23 and proximal portion 24. The distal portion 23 is a threaded lug adapted for being removably inserted into the second end 14 of the tubular member 12. The proximal portion 24 is generally cone-shaped such that a point of the cone is directed away from the threaded lug. A second embodiment of a drilling member is shown in FIG. 5 and is an auger type drilling member.

A liquid dispensing system dispenses liquid from a storage container and through the bore 16 in the tubular member 12. In the preferred embodiment a storage container 26 is fixedly mounted to an outside surface of the handle member 18. The storage container 26 has a removable cap 28 thereon for filling purposes.

A conduit 30 fluidly connects the storage container 26 to the bore 16 in the tubular member 12. The conduit 30 has a first end 31 and a second end 32. The first end 31 is fluidly connected to the storage container 26. The second end 32 is fluidly connected to a housing 34. The housing 34 is fluidly coupled in the bore 16. The housing 34 has an annular bore therethrough. The housing has a first open end 35 and second open end 36. The first open end 35 is integrally coupled to the conduit 30 and has an internal shoulder 37 thereon. The housing 34 has an inner surface, which has an annular groove 38 therein.

A pumping member 40 pumps the liquid from the storage container 26 to the bore 16. The pumping member 40 can be any conventional pump. Ideally, the pumping member 40 is a hydraulic pump. The pumping member 40 is mounted in the handle member 18. The pumping member 40 is fluidly coupled to the conduit 30 between the storage container 26 and the bore 16. A trigger 42 for actuating the pumping member is mechanically coupled to the pumping member. A portion of the trigger 42 extends through the handle member 18 to a location outside of the handle member 18 for communication with the user.

A diffusing member 44 diffuses the liquid into the soil. The diffusing member 44 comprises a hollow plug having a first end 46, a second end 48 and peripheral wall 50 therebetween. The first end 46 is adapted to be insertable into the housing 34. The peripheral wall 50 has an annular shoulder 52. The annular groove 38 in the housing 34 may receive the annular shoulder 52 for securing the diffusing member 44 in place. The first end 46 has an opening therein. The second end 48 is bulbous and has a plurality of apertures therein 54. A second embodiment is shown in FIG. 7 wherein the second end 48 will spray a single jet of liquid.

A first seal seals 56 the diffusing member 44. The first seal 56 is in the housing 34. The first seal 56 is generally abutted against the shoulder 37 in the housing 34. The first seal 56 is preferably an elastomeric washer.

A second seal 58 also seals the diffusing member 44 so that liquid does not travel around the diffusing member 44. The second seal 58 is an O-ring. The O-ring is fixedly coupled to the inside surface of the housing 34. The second seal 58 is positioned between the first seal 56 and the annular groove 38 such that the second seal 56 is between the peripheral wall 52 of the diffusing member 44 and the inside surface of the bore of the housing 34 when the diffusing member 44 is placed in the housing 34.

In the second embodiment, as shown in FIGS. 8 and 9, a canister 60, having pressurized fluid therein, is adopted to be slidably inserted into the first end 13 of the tubular member 12. The canister 60 has an end has seal 61 thereon. A pin member 62 is fixedly mounted in the tubular member 12 and the tip of the pin member is directed toward the first end 13 of the tubular member 12. The pin member 62 is generally hollow and is fluidly coupled to the bore 16. The canister 60 is placed in the tubular member 12 such that the pin member 62 punctures the seal 61 wherein the fluid in the canister 60 travels through the pin 62 and the bore 16.

In use, the user places the second end 14 of the tubular member 12 into the ground adjacent to the area when insecticide is needed. The used then injects the insecticide by actuating the pump 40 in the first embodiment, or lowering the canister onto the pin member 62 in the second embodiment. Different diffusers 44 or drilling members 22 may be used depending on the soil and need of the user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pesticide dispenser apparatus for dispensing pesticide into the soil, said apparatus comprising:
    a tubular member, said tubular member being elongate and having a first end and a second end, said tubular member being substantially cylindrical and generally hollow with a perimeter wall, a bore being formed in said tubular member through said perimeter wall and having an axis extending substantially perpendicular to a longitudinal axis of said tubular member, said bore being generally adjacent to said second end;
    a handle member for holding said tubular member, said handle member being integrally coupled to said first end of said tubular member;
    a means for dispensing liquid dispenses liquid from said tubular member through said bore;
    a drilling member for drilling into the soil, said drilling member having a distal portion and proximal portion, said distal portion being a threaded lug adapted for being removably inserted into said second end of said tubular member, said proximal portion being generally cone-shaped such that a point of the cone is directed away from said threaded lug;
    wherein said bore is positioned on said tubular member at a location separated from said drilling member;
    a diffusing member for diffusing the pesticide into the soil, said diffusing member comprising a hollow plug having a first end, a second end and peripheral wall therebetween, said first end being removably inserted into said bore of said tubular member, said second end of said diffusing member protruding from an outer surface of said tubular member in a direction transverse to the longitudinal axis of said tubular member, said second end having an opening for dispensing pesticide in an opening created by said drilling member.

2. The pesticide dispenser apparatus as in claim 1, wherein said handle member further comprising:
    a gripping means for gripping said tubular member, said gripping means extending around a portion of said tubular member generally adjacent to said handle member.

3. The pesticide dispenser apparatus as in claim 1, further comprising:
    said handle member being a rod, said rod being generally hollow, said rod having a middle portion being fluidly connected to said first end of said tubular member;
    said means for dispensing liquid comprising:
        a storage container, said storage container being fixedly mounted to an outside surface of said handle member;
        a conduit for fluidly connecting said storage container to said bore in said tubular member;
        a pumping member being mounted in said handle member and being fluidly connected to said storage container and said conduit.

4. The pesticide dispenser apparatus as in claim 3, further comprising:
    said conduit having a first end and a second end, said first end of said conduit being fluidly connected to said storage container, said second end being fluidly connected to a housing, said housing being fluidly coupled in said bore, said housing having an annular bore therethrough, said first end of said diffusing member being adapted to be inserted into said housing, said first end of said diffusing member having an opening therein, said second end of said diffusing member having an opening therein.

5. The pesticide dispenser apparatus as in claim 1, further comprising:
    a plurality of drilling members for drilling into the soil, each of said drilling members having a distal portion and proximal portion, each of said distal portions being a threaded lug adapted for being removably inserted into said second end of said tubular member, a first of said drilling members having a proximal portion being generally cone-shaped such that a point of the cone is directed away from said threaded lug, a second of said drilling members having a proximal portion being generally auger shaped.

6. The pesticide dispenser apparatus as in claim 1, wherein said means for dispensing liquid comprises:
    a canister, said canister having fluid therein, said canister being pressurized, said canister being adopted to being slidably inserted into said first end of said tubular member, said canister having an end having seal thereon;
    a pin member being fixedly mounted in said tubular member, said pin member being generally hollow and being fluidly coupled to said bore, wherein said canister is placed in said tubular member such that said pin punctures said seal, wherein said fluid in said canister travels through said pin and said bore.

7. The pesticide dispenser apparatus as in claim 1, wherein the second end of said diffusing member has a substantially domed-shaped protruding portion for protruding from the outer surface of said tubular member, said domed-shaped portion having a plurality of holes formed therein for permitting the pesticide to move out of the diffusing member into the ground.

8. The pesticide dispenser apparatus as in claim 1, wherein the second end of said diffusing member has a protruding portion with a round base and a substantially rectangular planar surface in a plane oriented substantially parallel to a plane of said round base, a perimeter surface extending from said round base to said planar surface being contoured in a generally conical shape.

9. A pesticide dispenser apparatus for dispensing pesticide into the soil, said apparatus comprising:

a tubular member, said tubular member being elongate and having a first end and a second end, said tubular member being substantially cylindrical and generally hollow with a perimeter wall, each of said first and second ends of said tubular member having openings therein, a bore being formed in said tubular member through said perimeter wall and having an axis extending substantially perpendicular to a longitudinal axis of said tubular member, said bore being generally adjacent to said second end;

a handle member for holding said tubular member, said handle member member being a rod, said rod being generally hollow, said rod having a middle portion being fluidly connected to said first end of said tubular member, said rod being orientated generally perpendicular to said tubular member;

a gripping means for gripping said tubular member, said gripping means extending around a portion of said tubular member generally adjacent to said handle member, said gripping means being an elastomeric coating;

a drilling member for drilling into the soil, said drilling member having a distal portion and proximal portion, said distal portion being a threaded lug adapted for being removably inserted into said second end of said tubular member, said proximal portion being generally cone-shaped such that a point of the cone is directed away from said threaded lug;

wherein said bore is positioned on said tubular member at a location separated from said drilling member;

a liquid dispensing system, said system comprising:
  a storage container, said storage container being fixedly mounted to an outside surface of said handle, said storage container having a removable cap thereon;
  a conduit for fluidly connecting said storage container to said bore in said tubular member, said conduit having a first end and a second end, said first end of said conduit being fluidly connected to said storage container, said second end being fluidly connected to a housing, said housing being fluidly coupled in said bore, said housing having an annular bore therethrough, said housing having a first open end and second open end, said first open end being integrally coupled to said conduit and having an internal shoulder thereon, said housing having an inner surface, said inner surface having an annular groove therein;
  a pumping member for pumping said liquid from said storage container to said bore, said pumping member being a hydraulic pump, said pumping member being mounted in said handle member, said pumping member being fluidly coupled to said conduit between said storage container and said bore, a trigger for actuating said pumping member being mechanically coupled to said pumping member, a portion of said trigger extending through said handle member to a location outside of said handle member;
  a diffusing member for diffusing the pesticide into the soil, said diffusing member comprising a hollow plug having a first end, a second end and peripheral wall therebetween, said first end being removably inserted into said bore of said tubular member, said second end of said diffusing member protruding from an outer surface of said tubular member in a direction transverse to the longitudinal axis of said tubular member, said second end having an opening for dispensing pesticide in an opening created by said drilling member;
  a first seal for sealing said diffusing member, said first seal being in said housing, said first seal being generally abutted against said shoulder in said housing;
  a second seal for sealing said diffusing member, said second seal being an O-ring, said O-ring being fixedly coupled to said inside surface of said housing, said second seal being positioned between said first seal and said annular groove such that said second seal is between said peripheral wall of said diffusing member and said inside surface of said bore when said diffusing member is placed in said housing.

10. The pesticide dispenser apparatus as in claim 9, wherein the second end of said diffusing member has a substantially domed-shaped protruding portion for protruding from the outer surface of said tubular member, said domed-shaped portion having a plurality of holes formed therein for permitting the pesticide to move out of the diffusing member into the ground.

11. The pesticide dispenser apparatus as in claim 9, wherein the second end of said diffusing member has a protruding portion with a round base and a substantially rectangular planar surface in a plane oriented substantially parallel to a plane of said round base, a perimeter surface extending from said round base to said planar surface being contoured in a generally conical shape.

* * * * *